United States Patent [19]

Subramanian et al.

[11] 4,252,038

[45] Feb. 24, 1981

[54] MODIFIED TOOL HOLDER TO PREVENT INSERT SLIPPAGE AND FRACTURE

[75] Inventors: Krishnamoorthy Subramanian, Inkster; Orrin A. Newton, Northville, both of Mich.

[73] Assignee: Ford Motor Company, Dearborn, Mich.

[21] Appl. No.: 76,118

[22] Filed: Sep. 17, 1979

[51] Int. Cl.³ .................... B23B 1/00; B23B 27/22
[52] U.S. Cl. ............................. 82/1 C; 407/5; 407/6; 407/100; 407/119
[58] Field of Search .............. 82/1 C; 407/2, 3, 4, 407/5, 6, 100, 119

[56] References Cited

U.S. PATENT DOCUMENTS

| | | |
|---|---|---|
| 2,166,826 | 7/1939 | Shepherd ................................ 407/5 |
| 2,480,226 | 8/1949 | Deibert ................................... 407/5 |
| 2,697,272 | 12/1954 | Clark ...................................... 407/5 |
| 2,791,824 | 5/1957 | Greenleaf ............................ 407/107 |
| 3,052,952 | 9/1962 | Bader et al. ........................... 407/6 |
| 3,189,975 | 6/1965 | Hammers ............................... 407/5 |
| 3,289,274 | 12/1966 | Brucato ............................... 407/100 |

FOREIGN PATENT DOCUMENTS 2409811  7/1979  France ........................................ 407/2

*Primary Examiner*—Leonidas Vlachos
*Attorney, Agent, or Firm*—Joseph W. Malleck; Olin B. Johnson

[57] ABSTRACT

A cutting tool holding system is disclosed. The system employs an improved chip breaker element having a lip mechanically gripping a radially extending and exposed edge of the cutting tool insert; the breaker element is held against relative sliding movement by a pin connection to a clamp which laterally urges the element and tool against the shank. Thus, the cutting insert is locked in place within the tool shank pocket avoiding premature failure from undue stress during prolonged tool cutting. The breaker element also has a chip breaker surface comprised of an arcuate segment spaced uniformly from the insert cutting point and a straight segment extending from the arcuate segment along the exposed edge of the insert.

8 Claims, 5 Drawing Figures

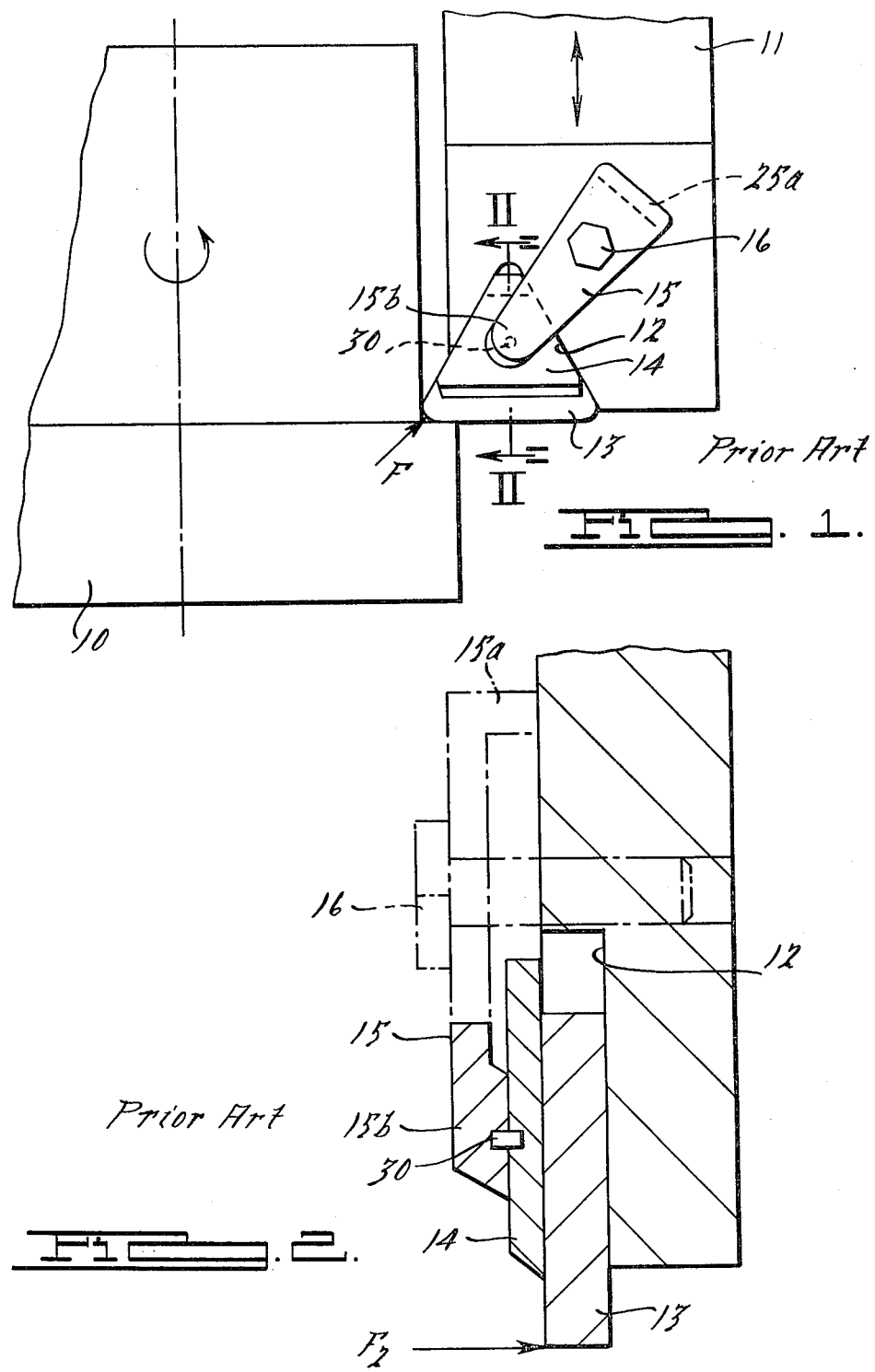

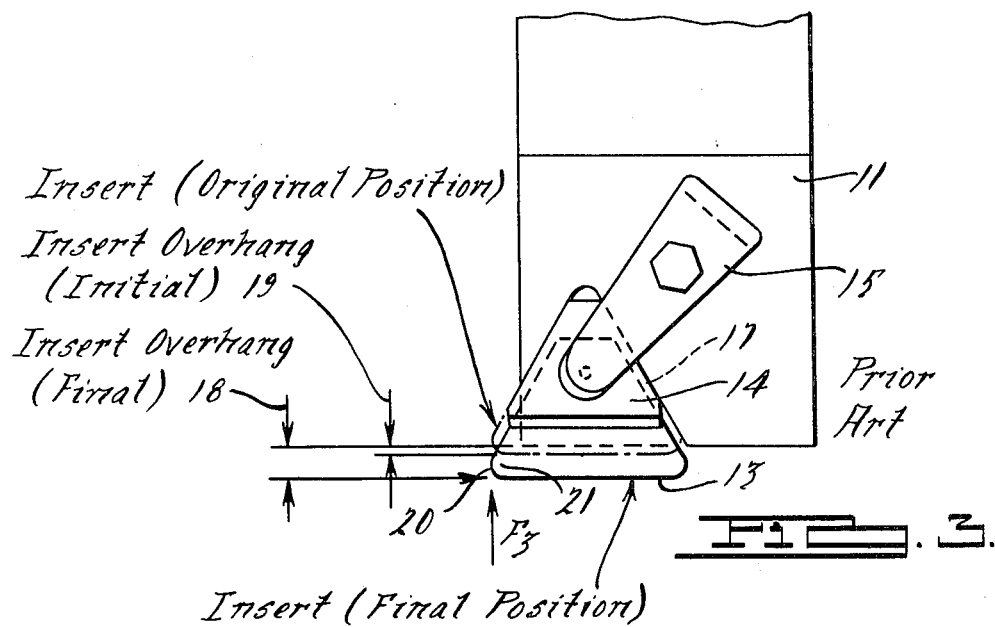
FIG. 3.
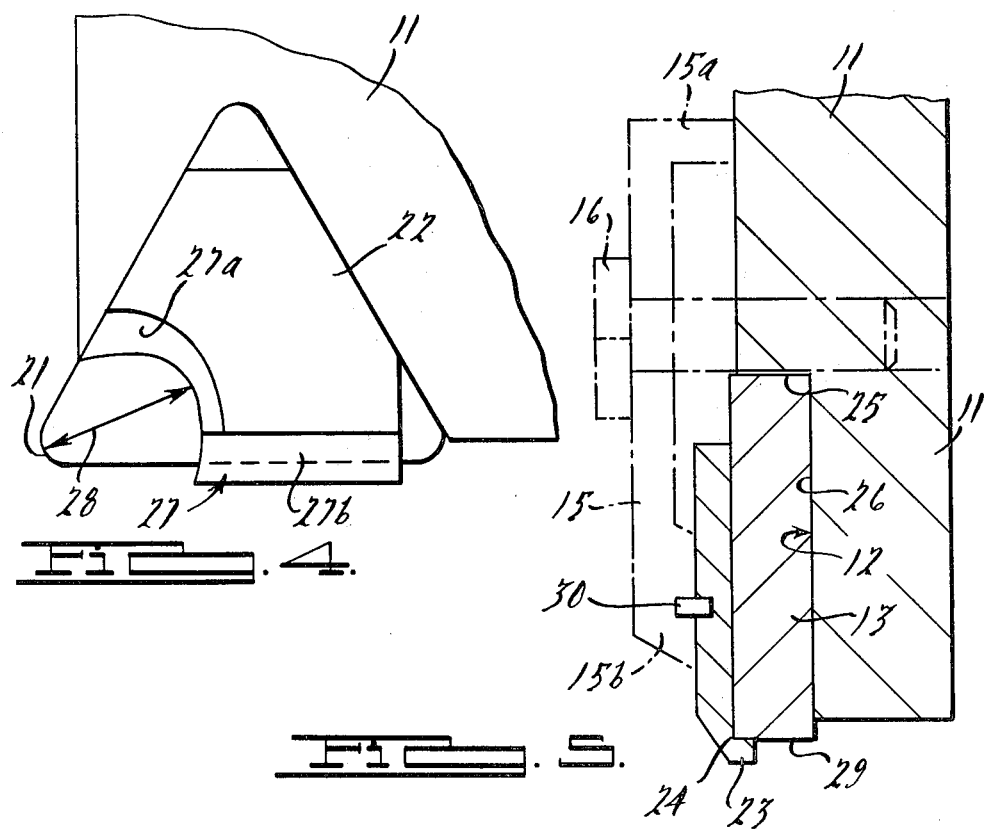
FIG. 4.
FIG. 5.

MODIFIED TOOL HOLDER TO PREVENT INSERT SLIPPAGE AND FRACTURE

BACKGROUND OF THE INVENTION

Hot pressed silicon nitride containing at least a primary addition of $Y_2O_3$, as a pressing aid has shown unusually superior results as a material useful in the cutting of cast iron. During the hot pressing, a crystalline second phase consisting of one or more of the three known types of yttrium silicon oxynitride is developed.

When cutting cast iron, a relatively large mass removal rate is experienced during machine cutting. It has been typical for the materials used earlier by the prior art, such as tungsten carbide and aluminum oxide to fail by thermal cracking. However, with hot pressed silicon nitride materials, the cutting tool can be utilized for continuous or interrupted cutting for periods in excess of 1–15 minutes and longer, whereas it is typical for a prior art tool to be utilized for 1/10 of such time. Accordingly, this new material is experiencing dramatic increases in tool life.

In spite of such increased longevity for the material from a metallurgical and wear resistant standpoint, the use of the tool has experienced one significant problem. This problem is connected with the manner in which the tool is mounted for cutting. It is typical for a metal shank to contain a pocket for receiving the cutting insert or tool. This insert is clamped in the pocket between the shank on one side and a chip breaker element on the other side. A chip breaker typically operates as a wedge in deflecting the cut chip so that they will break off from the workpiece and thereby be separated. The pocket in the tool holder is typically triangularly shaped, with the cutting insert projecting beyond the end of the shank, out of the pocket so that one point of the triangular insert is outside the sides of the shank to be free to cut; one end of the insert extends from such point in a direction generally aligned with the surface being cut. The cutting insert is held in place by frictional clamp; no holes are provided in the insert because of its ceramic nature which is notch sensitive. When the tool is withdrawn after each cycle of cutting, there may be slight frictional drag on the insert as it is pulled or dragged from the location of cutting for a repeat run. The drag tends to promote a pull on the insert causing it to pull slightly out of the pocket, allowing for debris and cut chips to become dislodged behind the insert; this eventually leads to undue forces on the insert as a result of an exaggerated overhang from the shank. The forces from the overhang position eventually result in premature fracture and failure of the tool insert with undesirable service life. This dilema of having a material which has an extremely long wear resistance and service life, but which can be mounted properly so that its service life is not prematurely cut short by unbalanced forces during machining, is a significant problem.

SUMMARY OF THE INVENTION

A primary object of this invention is to provide an improved tool holding system particularly suitable for use with increased-life type of ceramic cutting tools, which holding system prevents premature fracture failure in the cutting tool over extended use.

Another object of this invention is to provide a tool holding system which promotes uniform seating forces on the tool cutting insert throughout its entire cutting life.

Yet another object of this invention is to provide an improved method for cutting cast iron with silicon nitride, the method eliminating premature fracture failure resulting from unbalanced cutting forces and which method retains the integrity of the cutting tool even after long usage so that it may be ground for subsequent reuse.

Features pursuant to the above objects comprise:
(a) the definition of a chip breaker element so that it has a lip gripping mechanically the exposed edge of the cutting tool insert to provide a mechanical lock of the cutting tool insert within the holding pocket of the holder shank;
(b) unique configuration of the chip breaking element so that it has a working surface comprised of an arcuate segment spaced uniformly from the cutting point, and a straight segment extending from the arcuate segment along the exposed surface of the cutting tool insert which is directed generally parallel to the surface being cut;
(c) constituting the cutting tool insert of hot-pressed silicon nitride with pressing agents $Y_2O_3$ and/or $Al_2O_3$.

SUMMARY OF THE DRAWINGS

FIG. 1 is a schematic illustration showing a tool holder and cutting tool insert of the prior art in elevation as applied for a cutting run through a workpiece rotated about its own axis;

FIG. 2 is an enlarged fragmentary cross-sectional view taken substantially along line 2—2 of FIG. 1;

FIG. 3 is a schematic illustration similar to that of FIG. 1, showing a different position of the cutting tool insert as a result of sequential cutting cycles;

FIG. 4 is an enlarged elevational view of a part of the cutting tool assembly of the present invention; and FIG. 5 is a sectional view taken substantially along line 5—5 of FIG. 4.

DETAILED DESCRIPTION OF THE DRAWINGS

High metal removal rates and increased productivity can be achieved with relatively new ceramic tool materials based in silicon nitride. In order to fully utilize the benefits of this tool material, it is necessary to modify the tool holder assembly currently used in production. Instead of drilling openings through the cutting tool insert itself so that the insert may be clamped and bolted in place, the silicon nitride based materials must be clamped in place by frictional force; any type of interruption of the hot-pressed material by machining of internal openings would lead to premature fracture and weakening of the tool insert. Silicon nitride ceramics have a relatively low transverse rupture strength usually in the range of 70–110 ksi, and have other physical characteristics such as low resistance to crack propogation and notch sensitivity which could result in premature brittle fracture and hence internal machining of such inserts should not be carried out. In addition, such internal machining is very expensive and also induces micro-cracks which promote fracture.

Hot pressed silicon nitride material typically is prepared by mixing a first powder consisting substantially of alpha base silicon nitride having a cation impurity content of no greater than 1%, excluding free silicon. The first powder is well milled to a particle size of 1.5 microns. A second powder is prepared consisting of Y₂O₃ and a third powder consisting of aluminum oxide. Approximately 7-8 weight percent of the second powder and about 2.5 weight percent of the third powder is mixed with the first powder, and then placed in a compacting die where it is heated to approximately 1700° C. with about a 5000 psi load applied. The load is applied at room temperature before the die is brought up to temperature and the load is continued for 2 hours thereafter. The resulting material provides exceptional tool life when cutting cast iron; x-ray analysis shows the presence of crystallized yttrium silicon oxynitride compounds. The resulting hot-pressed product of course is shaped as a cutting tool (according to conventional cutting tool configurations) by a diamond cutting or other equivalent means. The product will have a density of 95% or more theoretical, a thermal-shock parameter at 1200° C. of at least $(110 \times 10^9 \text{ BTU-lbs.})/\text{Hour(in.}^3)$, a hardness value of at least 87 Rockwell 45-N, and a bend strength of at least 70,000 psi at 1200° C.

Turning now to FIG. 1, a typical prior art modification to hold the new material in place, is shown. A cylindrical work piece 10 is shown as being machined by a cutting tool insert 13 held in a tool holder 11. The insert 13 is a flat piece, triangularly shaped, adapted to fit within a truncated triangular recess 12 or pocket within the holder 11. The recess is arranged so that it intersects with one side and the end of the holder 11. The insert is held in place by clamp 15 which has one end 15a bolted to the holder 11 by conventional bolting assembly 16. The other end 15b of the clamp presses inwardly to impart a clamping force to the insert 10 via a chip breaker element 14. The chip breaker element 14 is interposed between the clamp and the insert and has direct frictional engagement with the cutting tool. Thus the insert is frictionally gripped by the side of pocket 12 and element 14.

Two kinds of machines exist for moving the tool holder, one in which a slide positions the tool holder to the correct dimension and feeds it vertically downward producing the required surface. The tool holder is withdrawn away from the surface, before lifting it upward to the initial position. This machine is undesirable because of cost and complexity.

In a second kind of machine the tool holder remains in one position corresponding to the size of the part and is fed vertically downward for cutting and is withdrawn vertically upward to its original position. This kind of machine is easier to build since it has a less number of movements for the tool holder and for the positioning slide. However, it has one significant disadvantage. While cutting, the tool tip or insert is under considerable pressure. The cutting forces deflect the tool holder assembly away from the workpiece. At the end of a cutting cycle the tool holder assembly returns to its original position. In the withdrawn position, it produces a helical groove on the workpiece. In addition, this drag causes the cutting tool insert to be pushed out of the triangular shaped pocket, as shown in FIG. 3, leaving a space 17. This sequence, occurring repeatedly over a number of cycles, will result in considerable overhang 18 (increased over the original overhang 19) of the tool out of the tool holder and result in unbalanced forces producing fracture and catastrophic failure. The extent of the drag force will depend on the initial deflection of the holder assembly, which in turn depends upon the cutting forces. Ceramic cutting tool inserts in general use a chamfer 20 along the point 21, which results in increased cutting forces rather than a nominally sharp edge. These forces also increase with the wear of the insert.

Unlike other cutting tools, the silicon nitride based ceramic materials perform successfully over a considerably longer period of time even when wear begins to take place in the insert. Thus, higher cutting forces can be expected during the useful life of such ceramic inserts. The "drag" and pull-out of the insert is more likely to occur with these ceramic inserts. This circumstance can be a serious matter in that it dissipates the longevity characteristics of such ceramic insert and reduces them to regular premature failure.

In order to prevent such premature mechanical failure, the present invention employs a modified chip breaker element 22 (see FIGS. 4-5) which is placed along side of the tool insert; it is arranged to provide uniform clamping pressure of the insert 13.

The chip breaker element has a lip 23 which extends around and grips the lower edge 24 of the triangular shaped insert. In this manner, the chip breaker element mechanically and positively holds the cutting tool insert in place during the return stroke, retaining it tightly in the recess pocket against walls 25 and 26 during the entire life of the insert. At no time is the insert allowed to move away from the internal sides 25-26 of the pocket as a result of drag forces or unbalanced cutting forces. The element 22 is fixed against relative sliding movement with the clamp 15 by a pin 30 fitting tightly in aligned openings in said clamp and element.

The modified chip breaker element also has a chip breaking surface 27 which is comprised of an arcuate segment 27a spaced a uniform distance 28 from the cutting point 21. A straight segment 27b extends from the arcuate segment 27a along the exposed edge 29 of the cutting tool insert (and extends generally parallel to the workpiece surface being cut.)

The improved tool holder system of the present invention provides:

(a) securement for the cutting tool insert to eliminate pull-out resulting from drag of the insert on the workpiece, and does not require holes in the cutting tool insert itself for securement, (b) improved productivity and reduced down time resulting from the use of such modified holding system, (c) catastrophic failure of the ceramic insert is eliminated and therefore the insert after being worn down an incremental amount during its normal service life can be fround or reused through salvage operations, (d) the modified chip breaker element will result in better chip breaking and the elimination of overhang by the insert.

We claim:
1. A cutting tool holding system, comprising:
(a) a holding shank having a recess in one side and end,
(b) a ceramic or carbide based cutting insert snugly fitting the shape of said recess and having a cutting point and a radial edge exposed outside of said recess for machine cutting of a metal workpiece,
(c) a clamp secured to said shank and overreaching said recess,
(d) a chip breaker element laying against the side of said insert, said element being interposed between said clamp and said insert effective to impart a frictional clamping force, as well as a positive me- chanical locking force, to said insert to retain the latter snugly in said recess during high stress machine cutting operations, said element having a lip mechanically gripping the radial edge of said insert and a chip breaker surface comprised of an arcuate segment spaced uniformly from the cutting point and a straight segment extending from the arcuate segment along the exposed edge of said insert.

2. The holding apparatus as in claim 1, in which said insert is triangularly shaped and said recess has a truncated triangular configuration exposed at one side and end of said shank.

3. The apparatus as in claim 1, in which said cutting insert is comprised of a composition consisting of silicon nitride based material having $Y_2O_3$ and $Al_2O_3$ in proportions of 7–8% and 2–3% respectively.

4. The apparatus as in claim 1, in which the clamp has one end positively fixed to said shank and an opposite end cantilevered over said recess for imparting a clamping force to an insert interposed therebetween.

5. The apparatus as in claim 1, in which the chip breaker element is secured against relative sliding motion with said clamping element by way of a pin.

6. The apparatus as in claim 1, in which said chip breaker element is stationed to prevent any movement of the cutting tool insert with respect to the holder and to prevent any slippage therebetween.

7. A method of machine cutting of cast iron, comprising:

(a) forming a metal cutting tool insert from a full dense silicon nitride based material containing 4–12% $Y_2O_3$ and 10% or less of a density promoting additive, (b) sawing said insert to a predetermined cutting bit configuration, (c) clamping said sawed tool insert against a tool holder having a multi-sided recess complimentary to the shape of said tool insert, said recess being located to permit said insert to overlap said tool a predetermined amount while snugly fitting against at least three sides of said recess, (d) sandwiching a chip breaker element between said clamp and insert, said breaker element being hooked to said clamp to eliminate lateral relative movement therebetween, said breaker element having a lip effective to lock said insert against said recess walls, (e) rotating a stock of cast iron against and relative to said mounted cutting insert for cutting the former, continuing said cutting for extended interrupted or continuous periods of at least 2 hours, and (f) removing said insert from said holder and grinding said insert to assume a shape conforming to said shape as sawed in step (b), and remounting said insert for additional cutting.

8. The method as in claim 7 in which said density promoting additive is $Al_2O_3$.

* * * * *